INVENTORS
ALBERT E. WORTHINGTON
JOHN E. WALSTROM

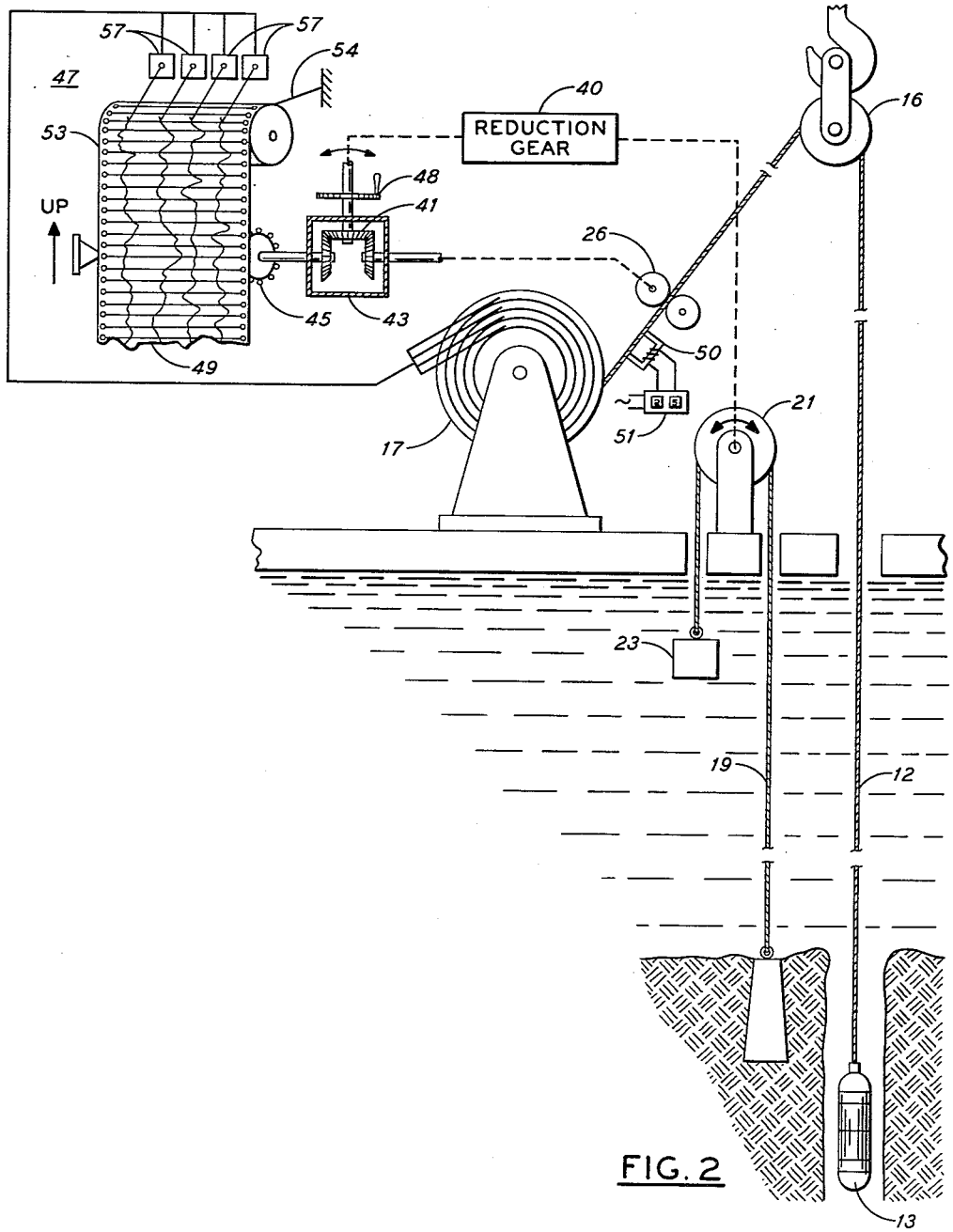

2,809,436

DEPTH CORRELATION IN WELL LOGGING APPARATUS

Albert E. Worthington, Laguna Beach, and John E. Walstrom, Orinda, Calif., assignors to California Research Corporation, San Francisco, Calif., a corporation of Delaware Application July 2, 1957, Serial No. 669,518

1 Claim. (Cl. 33—134)

The present invention relates to recording systems for well logging apparatus and more particularly to apparatus for controlling the recorded log to indicate directly the proper depth measurement, while the well logging instrument within the well bore, or logging sonde, and cable vary in depth when supported from an unstable structure, such as a floating vessel subjected to vertical wave motion.

It is an object of the present invention to provide a means for accurately recording the depth of a well logging sonde in a bore hole when supported from a floating drilling structure. As used herein, the word "sonde" means the container of instruments for detecting characteristics of subterranean strata which is lowered into a well bore in pursuance of a well logging operation. Types of sondes can be seen in the "Composite Catalog of Oil Field and Pipeline Equipment," published by World Oil, 3301 Buffalo Drive, Houston 19, Texas, 19th 1952–53 edition, vol. 2 at pages 4559 et seq.; 20th 1954–55 edition, vol. 2 at page 4460.

In the drilling of well bores for coring or actual petroleum exploration from a floating drilling structure, it has been found difficult to interpret the electric and resistivity logs, or other logs recording a physical measurement along a depth scale, when the logging cable is supported from the drill derrick or mast, as in dry land or fixed platform operations. In particular, when the drilling has been done from a vessel or boat, the normal vertical movement may be of the order of 2–5 feet, under conditions where E-logs are run. Such vertical variations in height occur cyclically at a rate of about 3 to 10 cycles per minute. This movement represents a relatively large vertical change in the recorded depth, even where the vertical logging speed is of the order of 20 feet per second. Thus, the indicated footage markers on the recorded log do not represent actual depth, since the logging sonde continuously oscillates, and therefore accelerates and decelerates, as it is withdrawn from the well bore.

In accordance with the present invention, a system is provided for automatically compensating for the vertical movement of the logging sonde and cable that includes a depth-sensing system comprising measuring cable means extending from a fixed anchor on the bottom over a pulley with the opposite, or free, end of said cable being maintained taut by a weight member movable up and down with the rise and fall of the floating platform. In accordance with the invention, the indicated depth of logging cable is continuously adjusted in response to this measured vertical motion, as detected by said pulley and weight arrangement. The rotational motion of the the position-sensing system is used to adjust in a compensatory direction the paper upon which the depth log is recorded.

Further objects and advantages of the present invention will become apparent in the following detailed description, taken in conjunction with the accompanying drawings, which form an integral part of the present specification.

In the drawings:

Fig. 2 is a schematic representation illustrating in greater detail the vertical motion compensating means utilized in the arrangement of Fig. 1.

Figure 1:
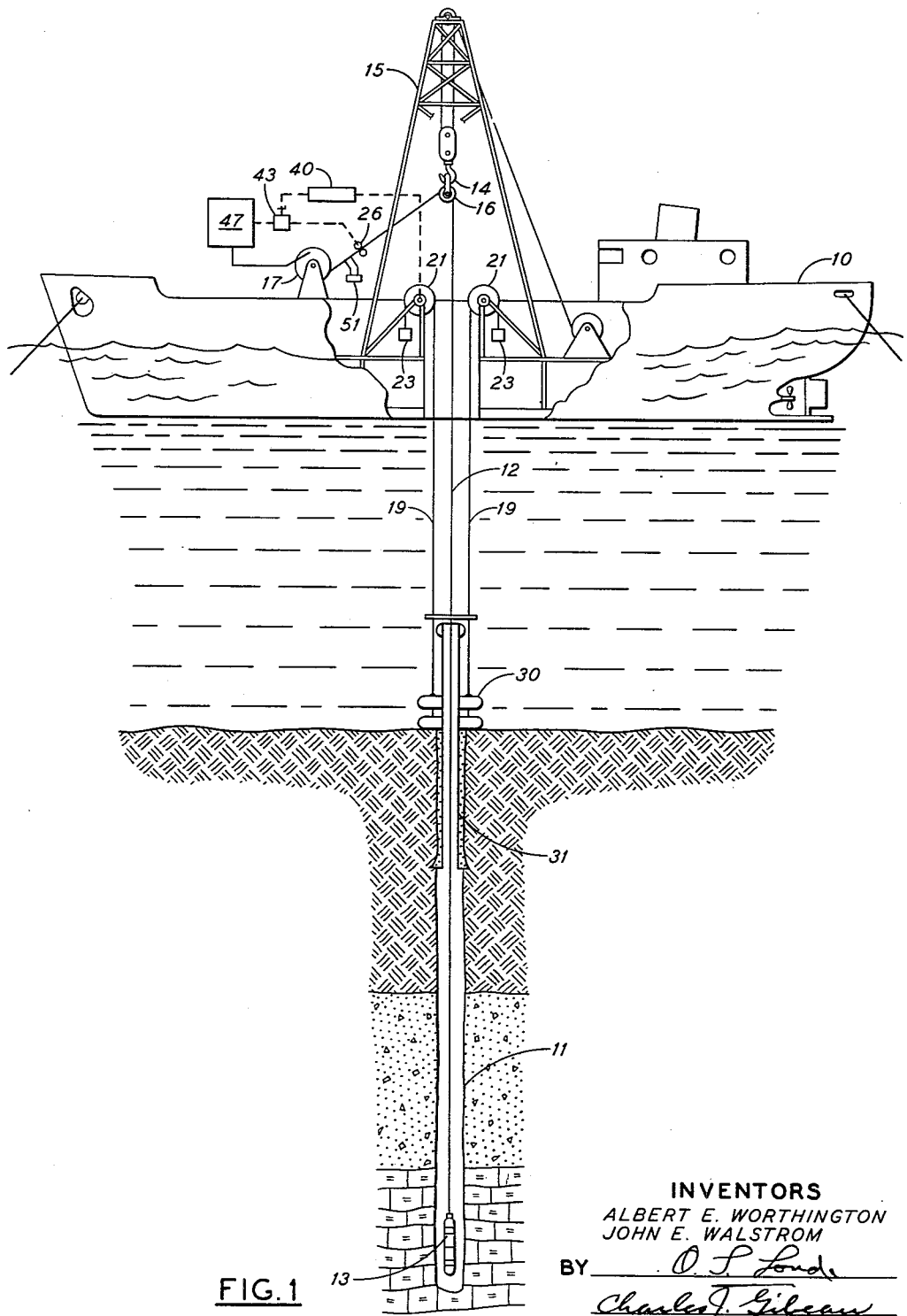
Fig. 1 is a side elevation, partially in section, of a floating well-drilling structure, such as may be used for coring operations in the ocean, and illustrates the form of the present invention as applied to an electrical logging system.

Referring now to the drawings, and in particular to Fig. 1, there is illustrated a coring vessel 10 from which bore hole 11 has been drilled into the underwater bottom while the vessel is moored in open sea.

As shown, the vertical movement of ship 10, due to its freely floating condition, results in logging cable 12 and logging sonde 13 attached thereto vertically rising and falling while sonde 13 traverses bore hole 11. Such movement results from cable 12 being directly supported by pulley 16 which hangs on hook and traveling block 14 in drill derrick 15. Thus logging cable 12 rises and falls with pulley 16, and supply drum 17, but the depth measurement of said drum, as determined by the rotation of rolls 26 will be only an average value of the true depth of sonde 13.

In accordance with the present invention, true depth of the sonde, during such vertical motion of cable 12 and sonde 13, induced by the heaving of ship 10, is indicated by compensating the record in response to a depth-sensing means. As shown in Fig. 1, the depth-sensing means comprises a ground-engaging cable 19, passing over a fixed pulley 21, with the opposite end of cable 19 terminating in a movable weight member 23 of sufficient mass to assure that substantially a constant tension is maintained in cable 19.

As shown in Figure 1, the ground-engaging cables 19 may, if desired, be used as guides for the setting of the blowout preventers 30 and casing 31. Since casing 31 is cemented in the underwater bottom, cables 19 are anchored to the underwater bottom so they may be used as depth-measuring lines.

It will be observed that the pulleys 21 will rotate, where no slippage occurs between them and cables 19, an amount directly proportional to the vertical rise or fall of the ship in the water. Thus the rotational movement of pulley 21 may be used to compensate the indicated depth of the logging sonde. As illustrated in Fig. 2, pulley 21 drives a reduction gear system identified as 40 to vary the indicated elevation of the logging cable and sonde. In this arrangmeent, a differential gear 41 in paper drive mechanism 43 is adjusted through reduction gearing 40. The position of cable 12 and hence the vertical location of logging sonde 13 is normally indicated by measuring rolls 26 rotating sprocket gear 45 on the paper drive mechanism of recorder 47. Differential gear 41, normally adjusted by hand wheel 48, positions record paper 49 to correspond with the exact length of cable expended from drum 17. This exact length of cable may be measured by magnetic elements or slugs placed in the sheath of logging cable 12, so that their passage may be detected by changes in a magnetic circuit through the cable, as indicated generally by the solenoid 50 and counter 51. The exact length of cable paid out from the drum may be manually adjusted by the operator's turning hand wheel 48 to position the record paper 49. Such an arrangement permits some slippage between roller 26 and cable 12 to be compensated with accuracy.

In accordance with the present invention, differential gear 41 is automatically rotated in response to the elevation of the structure above the underwater bottom. Thus rotation of pulley 21 turns reduction gear 40, and differential gear 41, to move recording paper 49 up and down an amount corresponding to the vertical motion of the supporting platform. As indicated schematically, paper roll 53 may be suitably biased by tension spring 54 to reverse the rotation, that is, rewind the paper, when the logging sonde goes down in the well, as the ship falls in the water. Since the electrical measurements are directly dependent on the resistivity or other vertical characteristics of the bore hole, said readings are substantially reproducible. Thus, the measured values indicated by the galvanometers 57 will record directly the proper measurement for the indicated depth.

In the foregoing detailed description, it will be seen that there is provided an apparatus for maintaining the indicated position of a well logging sonde and its accompanying electrodes or other detecting means in correspondence with their actual positions in the well bore. The indicated depth is compensated in the record by varying the record directly in accordance with the exact depth of the floating structure above the underwater bottom.

While various modifications and changes in the form of the invention illustrated and described hereinabove will occur to those skilled in the art without departure from the inventive concept, all such modifications and changes falling within the scope of the appended claim are intended to be included therein.

We claim:

Apparatus for logging a bore hole drilled from a floating platform comprising a logging sonde supported on a logging cable adapted to traverse said bore hole, pulley means for suspending the unsupported end of said logging cable and the sonde in the bore hole, cable supply means, means for indicating the length of cable released from said supply means, and means for compensating the indicated length of said cable when said floating platform rises and falls in the water under wave action, said compensating means including a cable having one end thereof fixed relative to the earth and supported adjacent its other end on a pulley means supported by said floating platform, the latter said cable being maintained taut by loading means engaging the said other end thereof, and means responsive to the relative motion between the latter said cable and said platform for maintaining the indicated length of the logging cable in said bore hole and the actual length of logging cable and the position of the logging sonde in said bore hole in substantially a fixed relationship while said floating platform rises and falls in the water, the latter said means including differential gear means operably connected between the said pulley means supporting the cable which has one end fixed relative to the earth and record paper adjusting means to adjust the position of said record paper to compensate the indicated depth of the logging sonde while said logging sonde is moving in the bore hole by motion induced by said floating platform.

No references cited.